J. T. SUSTAIRE.
Cotton-Chopper.
No. 225,890. Patented Mar. 23, 1880.
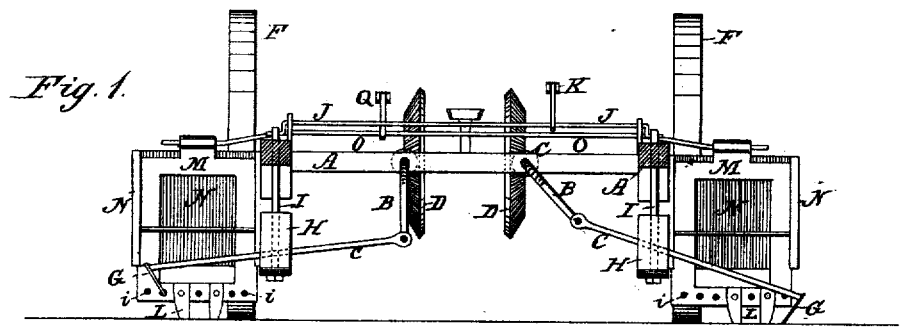
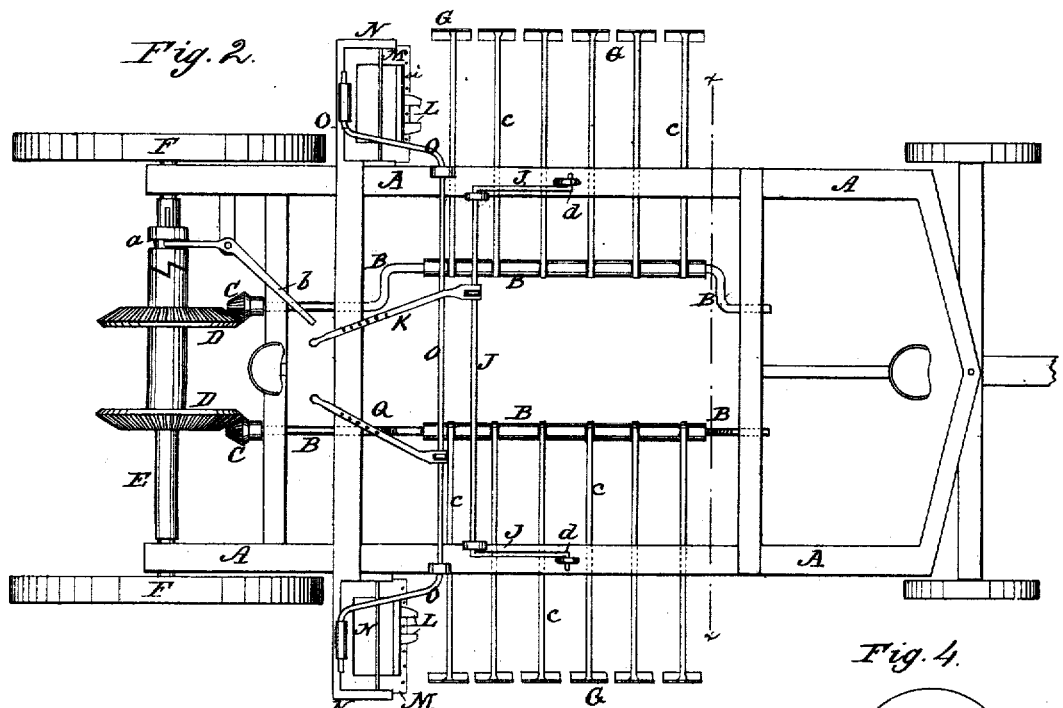
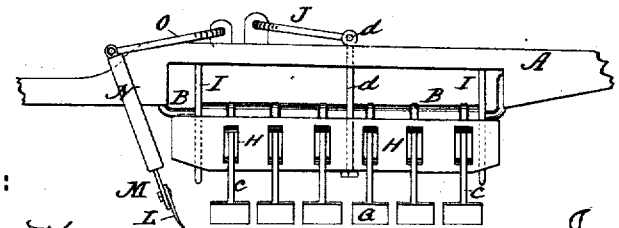
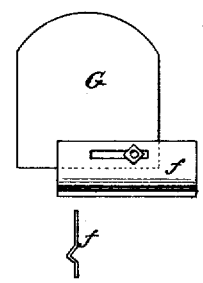
WITNESSES:
W. W. Hollingsworth
Amos W. Hart
INVENTOR:
Jno. T. Sustaire
BY
ATTORNEYS.

UNITED STATES PATENT OFFICE.

JOHN T. SUSTAIRE, OF MATTHEWS, NORTH CAROLINA.

COTTON-CHOPPER.

SPECIFICATION forming part of Letters Patent No. 225,890, dated March 23, 1880.

Application filed December 8, 1879.

*To all whom it may concern:*

Be it known that I, JOHN THOMAS SUSTAIRE, of Matthews, in the county of Mecklenburg and State of North Carolina, have invented a new and Improved Cotton-Chopper; and I do hereby declare that the following is a full, clear, and exact description of the same.

My invention is an improvement in the class of cotton-choppers having one or more hoes operated by a crank or similar means, and working across the rows of plants, or at right angles to the direction in which the machine advances.

I employ two sets or gangs of hoes, one operating on one side of the machine and the other on the other side, and to which a circular motion is imparted by separate crank-shafts rotated by gears fixed on the revolving axle of the rear transporting-wheels of the machine. Each set of hoes is followed by plows, which throw dirt up to or around the plants that have been thinned out, and both hoes and plows may be lowered or raised by levers acting on sliding guide bars or plates with which they are connected.

In the accompanying drawings, forming part of this specification, Figure 1 is a vertical cross-section on line *x x*, Fig. 2. Fig. 2 is a plan view. Fig. 3 is a side view of a portion of the machine. Fig. 4 is a detail view, showing an attachment of a hoe-blade.

The rectangular frame A of my chopper is supported by four transporting-wheels, the front axle being swiveled to adapt the machine for turning or following a curve. Two crank-shafts, B B, are arranged longitudinally of the frame A, and have pinions C on their rear ends, which mesh with gears D, fixed on a sleeve of the rear axle, E. The said sleeve may be caused to revolve with the latter by engagement with a clutch, *a*, operated by a hand-lever, *b*. The wheels F are fast on said axle E, and hence act as drivers, causing it to rotate, and thereby imparting like motion to the crank-shafts B B simultaneously.

A set or gang of hoes, G, is arranged on each side of the machine between the wheels, and operates in a plane at right angles to the line of motion of the machine. The handles or shanks *c* of the hoes of each gang are attached to the crank of that shaft B which is contiguous, and work in transverse slots in a bar, H, which is arranged beneath and parallel to a side bar of frame A, and adapted to slide vertically on fixed rods I.

The two guide-bars H H and their gangs of hoes G are lowered or raised by means of a cranked pivoted lever, J, whose ends are connected with said bars by means of rods *d*. The lever J is tilted by a hand-bar, K, which may be held fixed in any required position or adjustment by locking with a bar, *e*, fixed on the rear portion of frame A, contiguous to the driver's seat, so as to be operated conveniently.

The rotation of the crank-shafts B B imparts a circular motion to the hoes proper of both gangs simultaneously, their handles *a* sliding in the slots of the guide-bars H, which serve as fulcra. Thus the hoes are made to strike and thin out the rows of cotton-plants to a regular stand, one set of hoes acting on one row and the other on another, while the machine runs astride of a third or intermediate row.

To avoid undue shock or strain on the machine the shafts B are so geared with the respective wheels that one set of hoes strikes a little in advance of the other.

The number of hoes in a set may vary; but I prefer the number should not be less than four nor exceed eight.

The hoe-blades may be provided with an adjustable plate or wing, *f*, Fig. 4, to enable them to chop wider or narrower spaces in the rows of plants. In order that said wings may be made thin and light and yet have the requisite rigidity, and also to give them a slight spring, so that when the screw is tightened they may be made to clamp the hoe-blades with sufficient friction to enable them to retain the proper position, I construct them with a lengthwise rib or corrugation, as shown.

Following each set of hoes are plows or shovels L, which are attached to frames or bars M, that slide in guides or ways N, placed in a nearly-vertical position and just in front of the rear transporting-wheels. The two plows L of each set may be adjusted laterally on the wide bars or frames M, the lower edge of the latter being, for this purpose, provided with a series of holes, *i*, to receive the bolts that secure the plows thereto. The object of such adjustment is to enable the plows to throw more or less dirt up to and around the plants.

The bars or frames M, carrying the plows L, may be adjusted higher or lower by means of a pivoted crank-lever, O, whose position is controlled by a hand-bar, Q, arranged and locked similarly to lever J.

By the above-described construction and arrangement of parts I produce a machine with which two men and two horses can do the work of sixteen men and four horses using the ordinary chopping-out hoes and dirting-plows.

What I claim is—

1. In a cotton-chopper, the combination, with the wheeled frame, the crank-shafts, and the sets or gangs of hoes attached thereto, of the slotted bars serving as guides and fulcra for said hoes, the rods $d$, pendent from said frame, and the crank-lever rod and adjusting and locking bar, as shown and described.

2. In a cotton-chopper, the combination, with the sets or gangs of hoes, of plows or shovels L, attached to vertically-sliding frames or bars M, and the supporting-guides N, in which the said frames slide, as shown and described.

3. In a cotton-chopper, the combination of the adjustable plows or shares L with the frames M, provided with a row of holes at the lower edge and arranged to slide vertically in the supporting-guide N, as shown and described.

JOHN THOMAS $\overset{\text{his}}{\times}$ SUSTAIRE.
mark.

Witnesses:
J. S. REID,
A. W. REID.